Patented Sept. 4, 1934

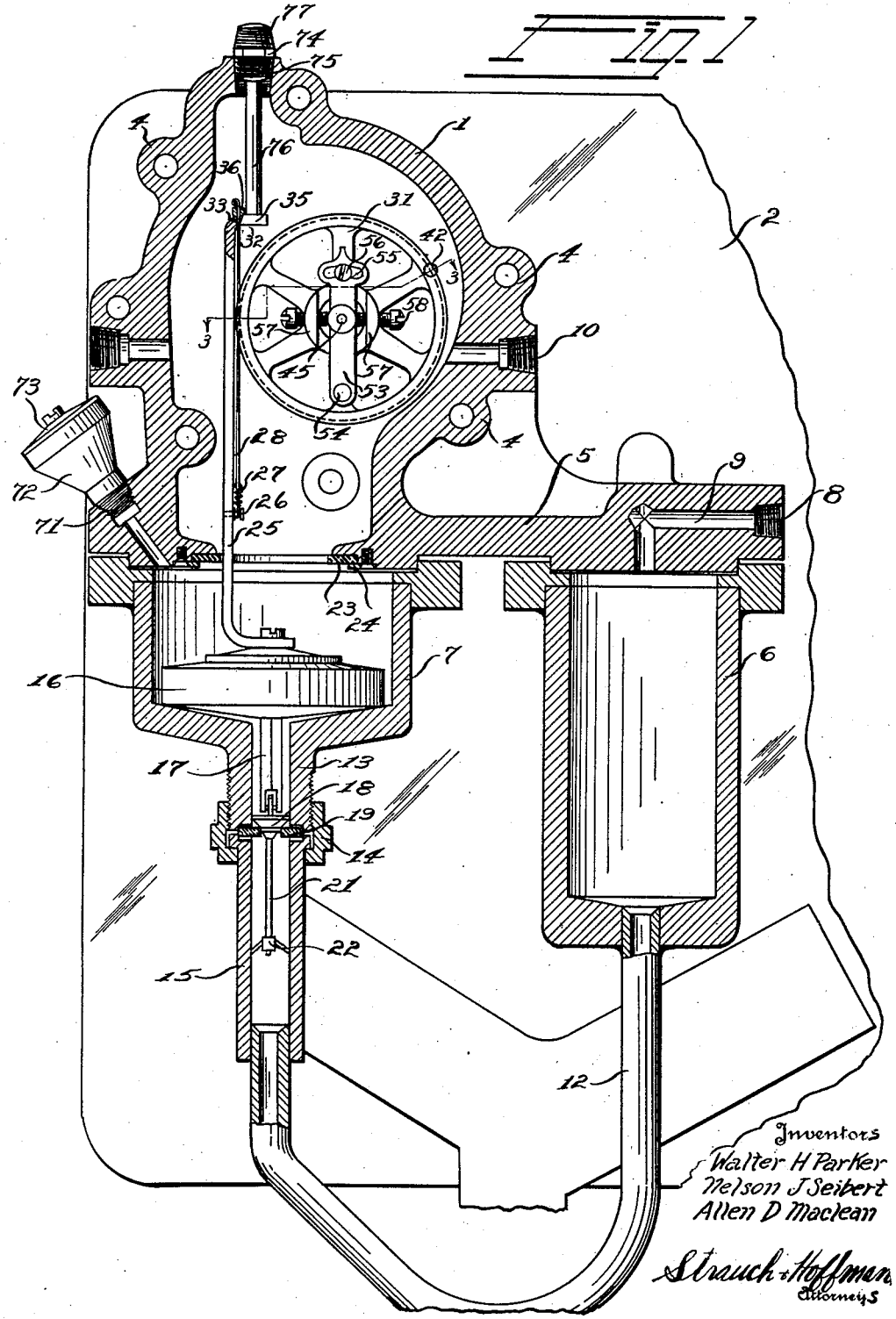

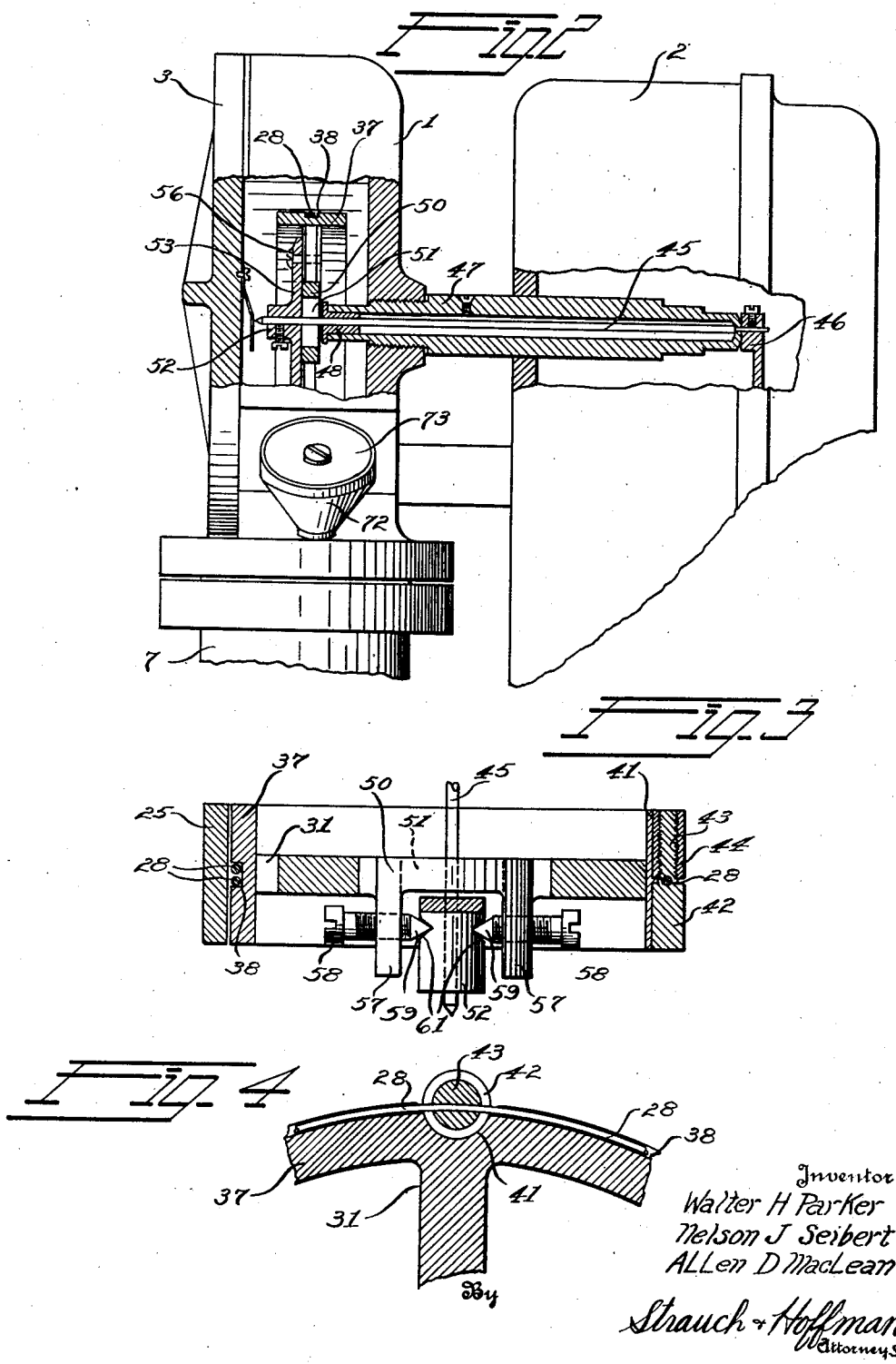

1,972,792

UNITED STATES PATENT OFFICE 1,972,792

WRAPPING CONNECTER ORIFICE METER

Valter H. Parker, Pittsburgh, and Nelson J. Seibert and Allen D. MacLean, Wilkinsburg, Pa., assignors to Pittsburgh Equitable Meter Company, Pittsburgh, Pa., a corporation of Pennsylvania Application February 28, 1930, Serial No. 432,197
Renewed October 9, 1933

10 Claims. (Cl. 73—31)

This invention relates to new and useful improvements in orifice meters used for measuring the flow of fluids.

In the usual type of orifice meter there is a restriction in a conduit through which the fluid passes, with pipes connected to the high and low pressure sides of said restriction. The high and low pressure pipes are connected to the high and low pressure chambers of the meter, the chambers being joined by a U-tube containing liquid. One of said chambers has a float therein, the vertical movements of which are in accordance with the differential pressure across said restriction, and are therefore in accordance with the rate of flow of fluid. An indicating or recording mechanism is generally associated with the float and operated by the vertical movements thereof to indicate or record the rate of flow of fluid.

In one type of orifice meter known as a wrapping connecter orifice meter a flexible member such as a wire or chain is wound partly around the perimeter of a rotary wheel and secured at one end to the float and at the other end to a weight, whereby downward movement of the float pulls the wire or chain and thus rotates the wheel, and upward movement of the float allows the weight secured to the opposite end of the wire or chain to rotate the wheel in the opposite direction. An indicating or recording mechanism is associated with the wheel to record the rotation thereof, and thus record the rate of flow.

In the type of orifice meter as above described one serious disadvantage is that there is a tendency to slip between the wheel and the wire, to thus introduce inaccuracies in recording.

One object of this invention, therefore, is to provide an orifice meter of the wrapping connecter type in which the wire or chain secured to the float goes completely around the perimeter of the rotary wheel and is secured at both ends to the movable float so that the movement of the float positively actuates the wheel in both directions.

Another disadvantage of the wrapping type orifice meter, as above described, is that calibration of the instrument to correct inaccuracies introduced by the machining of the high and low pressure chambers, cannot be simply and easily compensated for. It has been found to be extremely difficult to machine the chambers and the tube connecting them, to the exact proportions necessary for strict accuracy of the instrument, and even the coating of the chamber with varnish or enamel sometimes affects the accuracy thereof.

Another object of this invention therefore is to provide an orifice meter of the wrapping connecter type in which fine adjustments of and calibration of the instrument may be simply and expeditiously accomplished.

More specifically, it is an object of this invention to provide a calibrating and adjusting means for an orifice meter of the above type in which the wheel about which the flexible member wraps may be bodily moved with relation to the indicating shaft, whereby said wheel may be moved to various positions eccentric to said shaft.

Another object of this invention is to provide means associated with the wheel of a wrapping connecter orifice meter about which the flexible member wraps, whereby said flexible member may be simply and easily connected to the periphery of the wheel to obviate all possibility of slipping.

Another object of this invention is to provide simple means whereby the flexible member may be connected to or disconnected from the vertically moving float mechanism of a wrapping connecter orifice meter.

Another object of this invention is to provide a float operated orifice meter of the wrapping type in which the parts are compactly associated, whereby the overall dimensions of the meter may be reduced. More specifically, the above object is accomplished by securing an upright rod to the float in offset relation to said float, said rod having means thereon for securing the flexible member thereto.

Another object of this invention is to provide an orifice meter of the wrapping connecter type in which the parts cooperate to prevent excessive sidewise cocking or tilting of the float and the parts carried thereby.

These and various other objects of the invention will be apparent from the following description and the appended claims, when taken in connection with the accompanying drawings wherein:

Figure 1 is a rear view of our orifice meter with the cover removed from the main casing, and parts thereof being shown in section.

Figure 2 is a partial side elevation of Figure 1, with the main casing partly in section and part of the driving mechanism also in section.

Figure 3 is a section on an enlarged scale taken on line 3—3 of Figure 1.

Figure 4 is a section on an enlarged scale of a portion of the wheel rim with the wire locking element in position.

Referring to the drawings, a main casting 1 is secured to and spaced from the rear face of the casing 2 in which is contained the dial, not shown, and the indicating mechanism proper. The casting 1 is adapted to receive a cover 3, secured thereto in pressure-tight engagement by bolts passing through the perforated lugs 4. The casting 1 has an outwardly extending flange 5 to which is removably secured the high pressure chamber 6 and the low pressure chamber 7.

The low pressure chamber 7 is in communication with the casting 1 by an opening through the outstanding flange 5.

The flange 5 has a screw threaded opening 8 therein which communicates with a channel 9 leading into the high pressure chamber 6, and casting 1 has a threaded opening 10 communicating with the interior thereof. The threaded openings 8 and 10 are adapted for the reception of pipes which lead to the high and low pressure sides of an orifice or a restriction in a conduit, the flow through which is to be measured.

The bottom of the high pressure chamber 6 has an opening therein and a U-tube 12 is secured in said opening, preferably by welding, brazing or the like. The low pressure chamber 7 has an integral threaded nipple 13 thereon for receiving a coupling member 14, which secures pipe 15 to the nipple 13 in liquid tight engagement. The U-tube 12 is secured to the pipe 15 as by welding or brazing.

Positioned within the low pressure chamber 12 is the vertically movable float 16 which has a downwardly extending rod 17 upon which is loosely pivoted a valve 18. A valve seat 19 is clamped between pipe 15 and the nipple 13 by means of the coupling 14, upon which seat the valve 18 rests when the float is in its lowest position.

The valve 18 has secured thereto a downwardly extending rod 21 projecting into pipe 15, upon the lower end of which is a guiding spider 22, which loosely fits within the pipe 15. Rod 21 with the spider 22 thereon acts as a guide for vertical movement of the float 16 to assist in preventing sidewise cocking or tilting of the float as well as to guide valve 18 toward its seat.

A valve seat 23, preferably of rubber, is secured to flange 5 by a ring 24, said annular valve seat surrounding the opening connecting the low pressure chamber 7 and the hollow casting 1. The upper portion of float 16 is made conical for cooperative engagement with the valve seat 23, when the float is in its uppermost position.

By the provision of valves, as above described, loss of liquid from the U-tube 12 is prevented when suddenly applied excessive pressure is put upon the chambers. If the pressure on the chamber 7 is excessive the float 16 descends with the liquid in U-tube 12 until valve 18 seats upon the seat 19 at which time the pressure is cut off from the U-tube 12 and the liquid will not be blown out of the tube by further pressure. If the pressure in chamber 6 becomes excessive, the float 16 will rise to its upper position and the conical upper portion thereof will engage the valve seat 23 whereby liquid cannot be blown out of the chamber 7 into the casting 1.

The upper portion of the float 16 is provided with a screw threaded opening for the reception of a cap screw which clamps an upright member 25 to the float 16. The upright member 25 comprises a flat strip bent inwardly at the bottom thereof for engagement by the cap screw and also bent inwardly at the top as at 32. Adjacent the lower end of member 25 a screw 26 is secured thereto and a coiled extension spring 27 is secured to the screw 26. A flexible member such as a wire 28 has one end connected to the upper end of coiled spring 27 and said wire passes completely around the perimeter of the wheel 31 and is then secured to the upper portion of the upright member 25.

The bent-in portion 32 of the rod 25 has a conical depression 33 in the upper face thereof terminating in an opening through portion 32. A slot 35 through the portion 32 communicates with the said opening therein. The wire 28 passes through an opening in a conically shaped member 36 adapted to fit snugly within the conical opening 33, and said wire is knotted or looped over the upper end of member 36.

The improved securing means above described provides a simple and easy means of securing the wire to the upright member 25. In order to install the wire it is first looped around the wheel 31 and one end thereof is secured to the tension spring 27. The other end of the wire is then passed through the opening in conical plug 36 and knotted over the end thereof and the wire may then be drawn upwardly sufficiently to allow it to pass through slot 35 in member 32 and align with opening 33 therein. When the pull on the wire is then released the conical plug 36 fits snugly into the conical opening 33 of member 32 and the parts are firmly united. Disassembly of the wire is easily accomplished by reversing the above procedure. The tension spring 27 allows the wire to be pulled upwardly to allow it to be positioned on the bent-over portion 32.

From an inspection of Figure 3 it will be seen that the wheel 31 has a wide flange 37 at its periphery and the wheel is so positioned that the flange 37 thereof is in close proximity to the flat upright member 25 carried by the float 16. With the parts positioned as above described excessive sidewise cocking of the float and its associated parts is prevented since the flat member 25 will engage with the flange 37 of the wheel and the float is thus maintained in a correct position.

The circumferential flange 37 of the wheel 31 has a groove 38 cut into the exterior surface thereof for the reception of the wire 28. Wire 28 extends completely around the perimeter of the wheel 31, with both ends of the wire secured to the upright member 25 carried by float 16. By this construction the orifice meter is made more compact since it is not necessary to provide an elongated chamber in which a weight secured to one end of the wire may rise and fall, and since the wire is in contact with the periphery of the wheel throughout the entire 360° thereof, there is no tendency to slip. With a wire secured at one end to a float and passing only approximately half way around the wheel in contact therewith, the other end being secured to a weight, there is not a positive drive between the float and the wheel in both directions such as is accomplished in applicants' type of connection.

In order to further prevent any possibility of slippage between the wire 28 and the wheel 31, the peripheral flange 37 of the wheel has a semicylindrical notch 41 cut therein for the reception of a locking device. This locking device comprises an enlargement shown as a circular bolt 42 having a threaded extension 43 thereon provided with an opening adjacent the head 42 through which the wire 28 may be passed. A cylindrical nut 44 is adapted to be threaded on the screw threaded portion 43 of bolt 42. When the wire 28 is passed through the opening in the bolt 42 and the nut 44 threaded into clamping engagement with the wire, the wire is firmly united with the locking device. The notch 41 for the reception of the locking device is substantially of the same size as the locking device, being cylindrical, to prevent slippage between the locking device and the wheel. When the wire is being assembled on the orifice meter therefore one end thereof is slipped through the opening in the locking device and the nut 44 is clamped against the wire and the locking device is then positioned in the notch 41. By this means any possibility of slippage of the wire is prevented.

The indicating mechanism for our improved orifice meter includes a pen shaft 45 having an indicator arm 46 secured at one end thereof, as by a set screw, said pen shaft being positioned within a stuffing box 47. The stuffing box 47 joins the casing 1 containing the operating mechanism and the casing 2 containing the indicating pen and the scale or dial. A removable collar 48 closes one end of the stuffing box 47, said collar functioning as a journal bearing for the rotating pen shaft 45.

The pen shaft 45 passes through an enlarged central opening 51 of the hub 50 of wheel 31 and is secured as by a set screw to a hub 52 of an arm 53. Arm 53 is pivoted at 54 to one of the spokes of the wheel 31, the upper end of said arm having a slot 55 therein for the reception of a locking screw 56 which is threadedly engaged with another spoke of the wheel 31.

The hub 50 of wheel 31 has two outstanding segments 57 which extend in parallel relation to the hub 52 of arm 53. Segments 57 have screw-threaded openings therethrough for the reception of threaded driving pins or bolts 58. Bolts 58 have conical ends 59 which engage with corresponding notches 61 in the hub 52 of arm 53.

By means of the pins 58, it will be seen that rotation of the wheel 31 will be imparted to the hub 52 and thereby imparted to pen arm 45, since the pen arm is secured to hub 52 by a set screw. By this construction it will be seen that the wheel 31 may be positioned eccentric to the hub 52 carrying the pen arm 45. It is frequently desirable to increase or decrease the movement of the indicating pen arm 46 for the same vertical movement of the float, and it is also necessary to provide a ready adjustment for calibrating the meter, since slight variations in the high or low pressure chambers cause inaccuracies in the reading of the meter. These chambers and the tube connecting the same are accurately machined but certain variations in the side thereof inevitably occur, and since the rise and fall of the float is greatly multiplied, minor inaccuracies result in detrimentally affecting the accuracy of the meter. It has also been found that inaccuracies occur due to the varnishing, enameling and painting of the interior of the high and low pressure chambers, since sometimes the varnish or paint does not dry smoothly. For all of the above reasons it is necessary that accurate adjustment be provided to compensate for the inevitable inaccuracies of the meter.

By the construction as above described, the wheel 31 carrying the wire 28 may be offset with relation to the pen shaft 45 to thus vary the effective radius of the wheel. An increase of the effective radius decreases the rotation of the pen shaft 45, and a decrease of this radius increases the pen shaft rotation. In order to calibrate the instrument, it is merely necessary to loosen set screw 56, and turn one of the locking bolts 58 inward and the other outward, to thus change the eccentricity of wheel 31 with relation to hub 52. When the instrument is properly calibrated, the set screw 56 may then be tightened. It will be seen that rotation of the wheel 31 is directly transmitted to the pen shaft 45 by means of the locking bolts 58 engaging in the conical recesses 61 of the hub 52, hub 52 being secured to pen shaft 45.

As seen from an inspection of Figure 1, the arm 25 secured to the float 15 projects upwardly above the wheel 31. In alignment with this float rod the casing 1 has a threaded opening in the upper wall thereof, adapted to receive a plug device 74. This plug 74 has an extension 75 for threaded reception in the opening in casing 1, with a stop rod 76 projecting downwardly into the casing 1 into contacting engagement with the bent over portion 32 of the float rod 25. The plug 74 has a similarly threaded portion 77 extending in opposite direction and is adapted for reception in the opening in casing 1. When the orifice meter is being shipped, the plug 74 is threaded into the opening, as seen in Figure 1, and the rod 76 contacts with the bent-over portion 32 of float arm 25, to thus hold the movable parts of the meter in set position. By this means the movable parts of the meter can not be injured during shipment by movements thereof. When the meter is installed and ready for use, the plug 74 is unscrewed, turned over, and the portion 77 thereof is then screwed into casing 1 to close the opening therein. Thus the single element 74 functions as a stop and also as a plug to prevent loss of pressure. This is a feature of practical importance, since neither the shipping stop nor the plug can be lost, as one or the other is always in use.

A screw threaded channel 71 leading into the low pressure chamber 7 is provided with a funnel shaped filling connection 72 normally closed by a plug 73. When the instrument is set up for use, the liquid for the U-tube, such as mercury, may be poured into the funnel shaped opening of connection 72 upon removal of plug 73.

The operation of the device is as follows: The orifice meter is connected to the low and high pressure sides of a restriction in a conduit, the flow in which is to be measured. The low pressure pipe of the restriction is connected to the screw threaded opening 10 and the high pressure pipe is connected to the screw threaded opening 8. The proper amount of liquid such as mercury is poured in through the funnel shaped opening of connection 72. The plug 74 is first removed, to thus move the rod 76 out of engagement with the portion 32 of the float arm, and part 77 of the plug 74 is screwed into the opening for closing the casing 1.

The wire 28 is passed through the opening in the locking bolt 42 and the nut 44 thereof is then screwed to securely clamp the wire in position. The wire is then hooked to the spring 27 at one end and passed completely around the wheel 31, and secured at its opposite end to the conical plug 36. By drawing upwardly on the plug 36, the spring 27 expands and the wheel 31 of course rotates, and wire 28 may then be slipped through the slot 35 until it aligns with the conical opening 33. If the plug 36 is then released it engages in the conical opening 33, and the wire is thus secured at both ends to the float arm 25. The instrument is then ready for checking and calibrating.

In order to calibrate the instrument to increase or decrease the movement of the shaft for the same movement of the float 16, it is only necessary to release locking screw 56 and rotate locking pins 58 the necessary amount.

The movement of locking pins 58 varies the eccentricity of the wheel 31 with respect to the hub 52 carried by the pen shaft 45. This adjustment is very minute and extreme accuracy of the instrument may be obtained.

Since the locking bolt 42 engages in the notch 41 in the rim of wheel 31, obviously the wire 28 may not slip with regard to the wheel.

The float arm 25 may not tilt or twist sideways since it is positioned closely adjacent the rim 37 of the wheel 31, as seen in Figure 3. The float 16 and float arm 25 are therefore maintained in exactly vertical position for accurate measurement of the flow. The rod 21 with spider 22 thereon further aids in guiding the float vertically.

If the high pressure chamber 6 is subjected to excessive pressure the float 16 rises and seats against the valve seat 23 to prevent the flowing of the liquid in the U-tube 12 upwardly into casing 1. If pressure in low pressure chamber 7 becomes excessive, the float falls until the valve 18 seats on the valve seat 19, to prevent the liquid from being blown in the opposite direction, out of the tube 12.

The high pressure chamber and low pressure chamber are detachably engaged with the flange 5 of the meter, and may be interchanged with similar chambers. In order to substitute a different high pressure chamber, and therefore obtain a meter with a different range of movement, it is merely necessary to detach the union nut 14 from the nipple 13 and detach chamber 6 from the flange 5. The chamber 6 is removably secured to the flange 5 by cap bolts (not shown).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. In an orifice meter, a rotary indicator shaft, an operating wheel for said shaft and rotated in response to differential pressures, said wheel having a hub with an enlarged opening for the reception of said shaft, and longitudinally adjustable driving pins connecting said hub to said shaft, adjustment of said pins causing a bodily shifting of said wheel eccentrically with relation to said shaft to thereby calibrate the meter by adjusting the movements of the indicator shaft in response to rotation of said wheel.

2. The invention as defined in claim 1 wherein said rotary shaft is provided with notches therein, and said driving pins are screw-threadedly engaged with the wheel hub and have their ends seated in said notches.

3. The invention as defined in claim 1 wherein said rotary indicator shaft includes an arm extending at right angles thereto, means pivotally supporting said arm to said wheel, and means for securing said arm to said wheel in various adjusted positions.

4. An orifice meter comprising a pressure chamber, a float therein, a wheel, a flexible member secured to and operable by said float and engaging the periphery of said wheel, said wheel having a member with a concentric enlarged opening, an indicator shaft member having one end positioned within said opening, and a drive connection between said wheel and said shaft member including an adjustable pin threaded into one of said members and bearing against the other of said members, whereby said shaft and said wheel may be shifted to various relative eccentric positions.

5. In an orifice meter of the wrapping connecter type, a low pressure chamber, a float therein, a substantially vertical rod secured to said float, a wheel secured to an indicator shaft, a flexible member wrapped completely around said wheel and having both ends secured to said rod, one end of said flexible member having an enlarged plug, said rod having a socket to receive the plug and communicating with a slot in the rod through which said member may pass, whereby said member may be disconnected from the rod.

6. The invention as defined in claim 5 wherein the other end of said flexible member is secured to a spring, said spring being secured to the rod.

7. In an orifice meter of the wrapping connecter type, an indicator operating wheel, a drive for said wheel comprising a flexible member wrapped around the periphery of said wheel, and means for preventing slippage between said wheel and said flexible member, said means comprising a locking device securely fixed to said flexible member, and there being a notch in the periphery of said wheel for receiving said locking device.

8. The invention as defined in claim 7 wherein said locking device comprises two screw-threadedly engaged members clamping said flexible member therebetween.

9. In an orifice meter of the wrapping connecter type, a low pressure chamber, a float therein, an indicator shaft and a wheel for rotating the same, a rod secured to said float and having a surface cooperating with the surface of said wheel to prevent cocking of said float rod, and a flexible member wrapped completely around said wheel with both ends thereof secured to said rod.

10. In an orifice meter of the wrapping connecter type, a low pressure chamber, a float therein, an indicator shaft and a wheel for rotating the same, a rod secured to said float and having a surface cooperating with the surface of said wheel to prevent cocking of said float rod, and a flexible member wrapped completely around said wheel with both ends secured to said rod, and means for shifting the center of said wheel relative to said indicator shaft for adjusting the relation between chart range and float travel.

WALTER H. PARKER.
NELSON J. SEIBERT.
ALLEN D. MacLEAN.